(12) United States Patent
Kindred et al.

(10) Patent No.: US 8,064,494 B2
(45) Date of Patent: Nov. 22, 2011

(54) LAST FINGER POLLING FOR RAKE RECEIVERS

(75) Inventors: Daniel R. Kindred, La Jolla, CA (US); Jeffrey Levin, San Diego, CA (US); Steven J. Halter, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1638 days.

(21) Appl. No.: 10/447,631

(22) Filed: May 28, 2003

(65) Prior Publication Data

US 2004/0240528 A1 Dec. 2, 2004

(51) Int. Cl.
*H04B 1/00* (2006.01)
*H04L 27/00* (2006.01)
*H04L 27/06* (2006.01)

(52) U.S. Cl. ........ 375/136; 375/150; 375/152; 375/316; 375/343

(58) Field of Classification Search ........... 370/335, 370/485, 488, 449, 412, 413, 415, 345, 346, 370/342, 351, 431, 437, 441; 455/509, 501, 455/500, 132, 130, 150.1, 188.1, 201, 202, 455/203, 220, 562, 442, 450, 410, 411, 423, 455/67.11, 456.1, 432.1, 67.16, 421, 435.1, 455/69, 517, 518, 452, 513, 522, 550; 375/130, 375/136, 152, 150, 147, 148, 142, 143, 144, 375/316, 340, 341, 343, 342
See application file for complete search history.

(56) References Cited

U.S. PATENT DOCUMENTS

| | | | |
|---|---|---|---|
| 6,366,606 B1* | 4/2002 | Sriram | 375/150 |
| 6,515,977 B2* | 2/2003 | Bi et al. | 370/342 |
| 6,754,252 B1* | 6/2004 | Aldaz | 375/148 |
| 6,915,123 B1* | 7/2005 | Daudelin et al. | 455/410 |
| 6,975,670 B1* | 12/2005 | Aldaz et al. | 375/144 |
| 6,987,798 B2* | 1/2006 | Ahn et al. | 375/148 |
| 7,012,952 B2* | 3/2006 | Jayaraman et al. | 375/148 |
| 7,039,096 B2* | 5/2006 | Han | 375/148 |
| 7,072,428 B2* | 7/2006 | Niva et al. | 375/348 |
| 7,136,369 B2* | 11/2006 | Reznik et al. | 370/342 |

(Continued)

OTHER PUBLICATIONS

International Search Report, PCT/US2004/017160, International Searching Authority, European Patent Office, Nov. 15, 2004.

(Continued)

*Primary Examiner* — Dac Ha
*Assistant Examiner* — Linda Wong
(74) *Attorney, Agent, or Firm* — Howard H. Seo; Sayed H. Beladi

(57) ABSTRACT

Techniques for polling fingers on a channel (which are fingers for which symbols are to be combined) to determine the last finger on the channel. As each finger is polled, the polled finger compares its state information with the state information for the channel to determine whether or not it is the last finger on the channel. The polled finger may be deemed as the last finger if (1) the polled finger is the current last finger, (2) the polled finger is later than the current last finger, or (3) all fingers on the channel have been polled and none of the fingers indicated that it is the last finger. If the polled finger is deemed as the last finger then, (1) the channel state information is updated with the polled finger state information, and (2) the symbols provided by the polled finger may be marked as being ready for subsequent processing.

34 Claims, 7 Drawing Sheets

U.S. PATENT DOCUMENTS

| | | | |
|---|---|---|---|
| 7,200,133 B2 * | 4/2007 | Lin | 370/342 |
| 7,340,017 B1 * | 3/2008 | Banerjee | 375/348 |
| 2002/0024992 A1 * | 2/2002 | Ogawa et al. | 375/148 |
| 2002/0094021 A1 | 7/2002 | Eo et al. | 375/148 |
| 2002/0167923 A1 * | 11/2002 | Sendonaris et al. | 370/335 |
| 2002/0176393 A1 * | 11/2002 | Maruyama | 370/342 |
| 2003/0007468 A1 * | 1/2003 | Joshi et al. | 370/335 |
| 2004/0114673 A1 * | 6/2004 | Panchal et al. | 375/148 |
| 2004/0139466 A1 * | 7/2004 | Sharma et al. | 725/72 |

OTHER PUBLICATIONS

Written Opinion, PCT/US2004/017160, International Searching Authority, European Patent Office, Nov. 15, 2004.

International Preliminary Examination Report, PCT/US2004/017160, International Preliminary Examining Authority, United States, Mar. 5, 2006.

* cited by examiner

LAST FINGER POLLING FOR RAKE RECEIVERS

BACKGROUND

1. Field

The present invention relates generally to data communication, and more specifically to techniques for polling for last finger on a channel in a digital communication system.

2. Background

In a wireless communication system, a modulated signal transmitted from a transmitter (e.g., a terminal) may reach a receiver (e.g., a base station) via a number of signal paths due to artifacts in the propagation environment (e.g., building, natural structures, and so on). A received signal at the receiver may thus include a number of multipath components, each of which corresponds to a signal instance received via a different signal path. Since the receiver may also receive signals from multiple transmitters, the received signal may thus include a number of multipath components for a number of transmitters.

For a digital communication system, a rake receiver is often used to process a number of multipath components in the received signal for a given "channel". A channel may refer to, for example, a data transmission from a specific terminal. The rake receiver normally includes one or more searcher elements and a number of demodulation elements, which are often referred to as "searchers" and "fingers", respectively. Each searcher may be operated to process the received signal to search for strong multipath components. Each finger may then be assigned to process a different multipath component of sufficient strength. By assigning a number of fingers to process a number of multipath components for the channel and combining demodulated symbols from all assigned fingers, more of the energy in the received signal may be collected for the channel and improved performance may be achieved.

Each multipath component is associated with a particular propagation delay and a particular time of arrival at the receiver, both of which are determined by the signal path. Each active finger is then associated with a respective time offset that is determined by the arrival time of the multipath component assigned to the finger. Each active finger would then process the received signal based on its time offset and provide demodulated symbols for its assigned multipath component. The demodulated symbols from each finger are "deskewed" (i.e., aligned in time) and accumulated with demodulated symbols from other fingers on the same channel to provide final demodulated symbols for the channel.

When multiple fingers are assigned to process multiple multipath components for a given channel, it is necessary to wait for the last finger to finish its processing before the final demodulated symbols for all assigned fingers can be processed by subsequent stages. The received signal can be buffered until the deskewed signals from all signal paths are received and then processed, or the demodulated symbols can be stored until the last finger is processed. In the later case, the last finger is normally the one assigned to process the latest arriving multipath component for the channel. Conventionally, the final demodulated symbols are buffered for a duration of time that is longer than the largest expected difference between the earliest and latest arriving multipath components (which is commonly referred to as the delay spread). By buffering the final demodulated symbols for this length of time, the last finger can be assured to have finished its processing, and the buffered final demodulated symbols may then be provided to subsequent processing stages.

This conventional mechanism for ensuring that the last finger has finished its processing is not efficient for several reasons. First, the buffering needs to cover the largest expected delay spread for the system, which may be long for some Code Division Multiple Access (CDMA) systems. Second, longer processing delay is incurred by having to wait for the largest expected delay spread to elapse before initiating subsequent processing on the final demodulated symbols.

There is therefore a need in the art for techniques to more quickly and efficiently determine when the last finger has finished its processing so that the final demodulated symbols may be expediently processed.

SUMMARY

Techniques are provided herein to poll fingers on a channel to determine when the last finger has finished its processing so that the demodulated symbols may be processed by subsequent stages. Fingers on the channel refer to fingers for which demodulated symbols are to be combined to obtain final demodulated symbols (e.g., fingers assigned to process a given data transmission). These techniques are especially applicable when the fingers perform processing independently and/or at different times.

For last finger determination, as each finger on the channel is polled, the polled finger compares its state information with the state information for the channel to determine whether or not it is the last finger on the channel. In an embodiment, the polled finger is deemed as the last finger if (1) the polled finger is the finger currently considered as the last finger (i.e., the current last finger), (2) the polled finger is later than the current last finger, or (3) all fingers on the channel have been polled and none of these fingers indicated that it is the last finger (e.g., because the current last finger has been removed).

If the polled finger is deemed as the last finger then (1) the state information for the channel is updated with the state information for the polled finger, and (2) the demodulated symbols provided by the polled finger may be marked as being ready for subsequent processing. The state information for the polled finger is updated with the channel state information regardless of whether or not the polled finger is the last finger.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The last finger polling techniques described herein may be used for both uplink (reverse link) transmissions from the terminals to the base stations and downlink (forward link) transmissions from the base stations to the terminals. For clarity, these techniques are specifically described for uplink transmissions.

Figure 1:
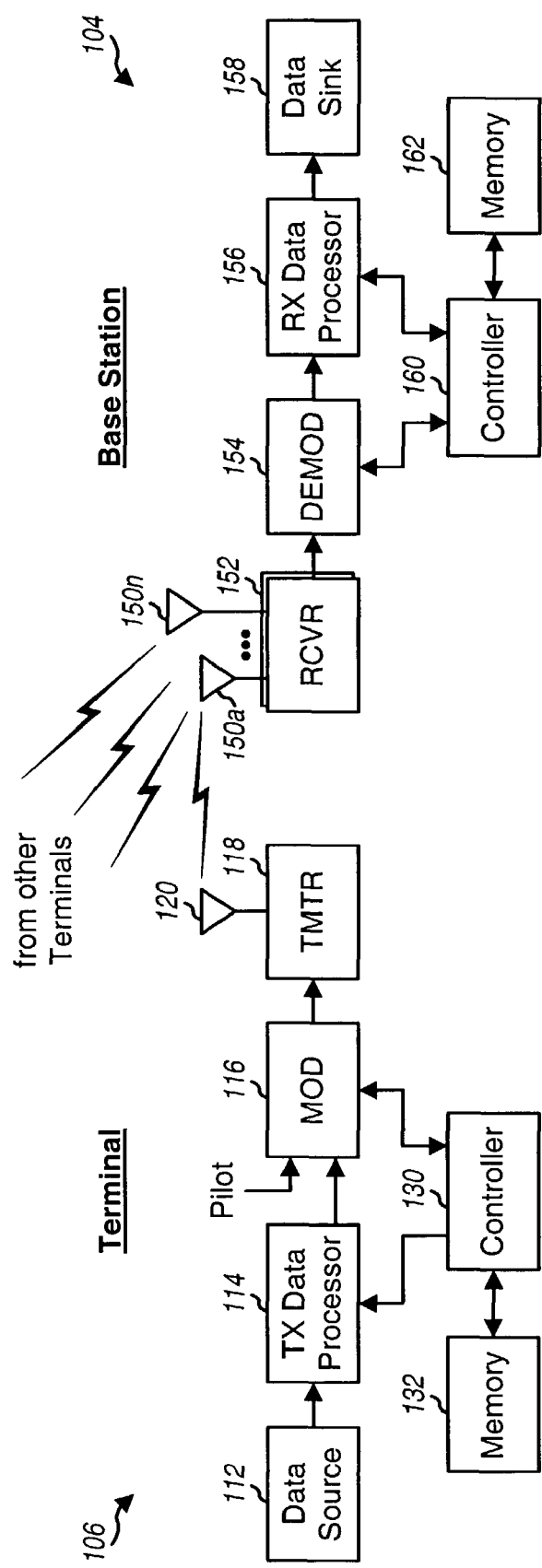
FIG. 1 shows a block diagram of a base station and a terminal in a wireless communication system.

FIG. 1 shows a block diagram of a base station 104 and a terminal 106 in a wireless communication system (e.g., a CDMA system). On the uplink, at terminal 106, a transmit (TX) data processor 114 receives traffic data from a data source 112 and signaling data from a controller 130. TX data processor 114 then formats and codes the data based on one or more coding schemes to provide coded data. A modulator (MOD) 116 then receives and processes the coded data and pilot data to provide modulated data. For a CDMA system, modulator 116 "spreads" or "covers" the coded and pilot data with different channelization codes to channelize the traffic data, signaling data, and pilot data onto their respective code channels. For a CDMA system, modulator 116 further spectrally spreads the channelized data with a spreading sequence that is unique for the terminal. The pilots from different terminals may thus be identified by their different spreading sequences.

The modulated data is then provided to a transmitter unit (TMTR) 118 and conditioned to generate an uplink modulated signal. The conditioning may include conversion to one or more analog signals, amplification, filtering, and frequency upconversion. The uplink modulated signal is then transmitted via an antenna 120 and over a wireless link to one or more base stations.

At base station 104, the uplink modulated signals transmitted from a number of terminals are received by each of one or more antennas 150. Multiple antennas may be used at the base station to provide spatial diversity against deleterious path effects such as fading. As an example, for a base station that supports three sectors, two antennas may be used for each sector and the base station may then include six antennas. In general, the base station may be equipped with any number of antennas.

The received signal from each antenna 150 is provided to a respective receiver unit (RCVR) 152. Each receive signal may include one or more signal instances (i.e., multipath components) for each of a number of terminals. Each receiver unit 152 conditions (e.g., filters, amplifies, and frequency downconverts) its received signal and further digitizes the conditioned signal to provide a stream of data samples for that received signal.

A demodulator (DEMOD) 154 then processes the data samples for all received signals to provide demodulated data. Demodulator 154 may implement a rake receiver that can process a number of multipath components in each received signal, as described below. A receive (RX) data processor 156 then decodes the demodulated data to recover the traffic and signaling data transmitted on the uplink by each active terminal. The processing by demodulator 154 and RX data processor 156 is complementary to that performed by modulator 116 and TX data processor 114, respectively.

Controllers 130 and 160 direct the operation at the terminal and the base station, respectively. Memory units 132 and 162 provide storage for program codes and data used by controllers 130 and 160, respectively. For simplicity, FIG. 1 does not show all of the processing units that are normally present at the terminal and the base station.

Figure 2:
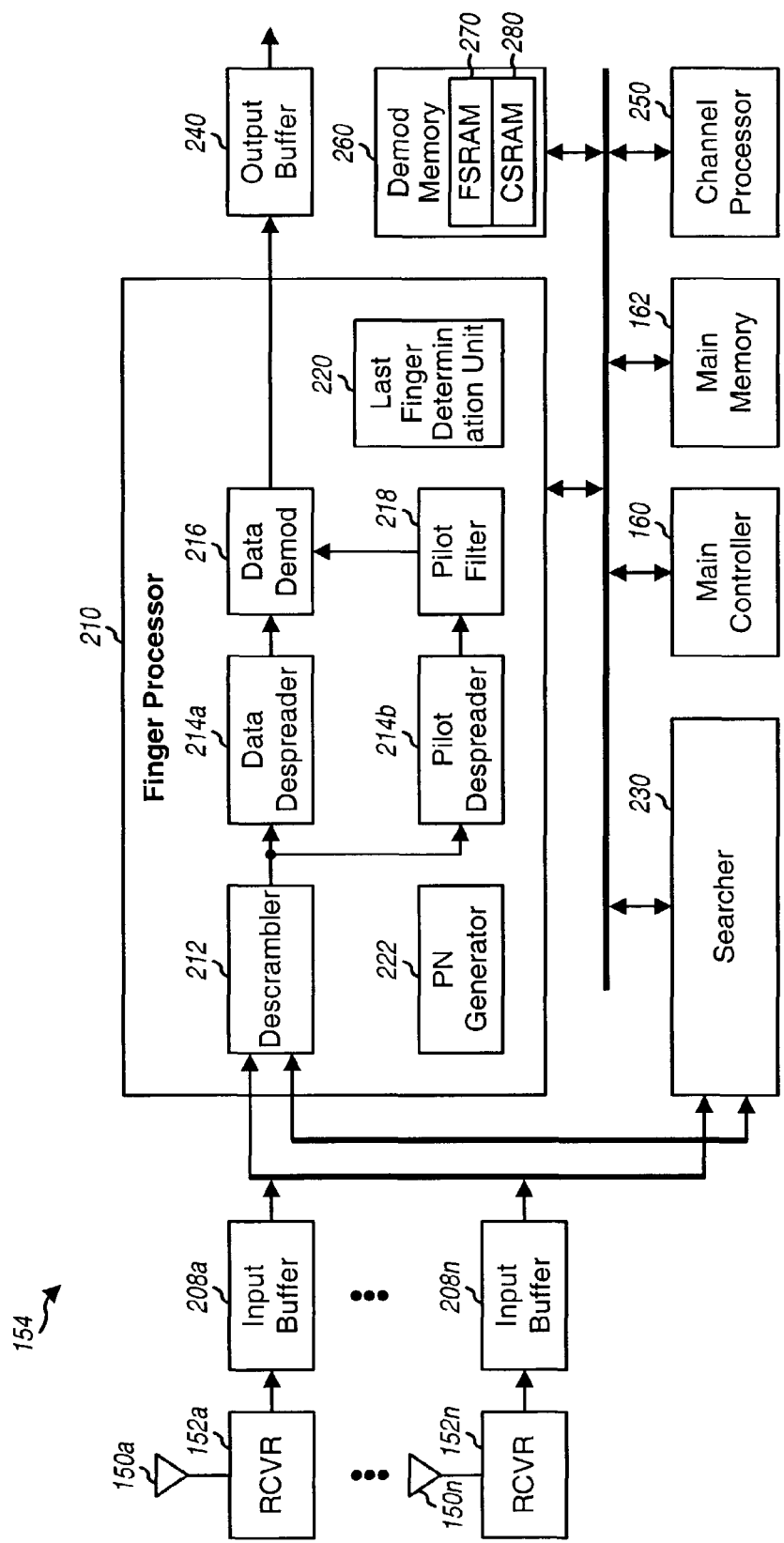
FIG. 2 shows a block diagram of a demodulator.

FIG. 2 shows a block diagram of an embodiment of demodulator 154. Demodulator 154 implements a rake receiver that includes a finger processor 210 and a searcher 230. Finger processor 210 may be operated at a high clock speed to effectively implement Q "virtual" fingers, where Q may be any integer one or greater.

As shown in FIG. 2, the data samples for each received signal are provided to a respective input buffer 208, which stores the data samples for subsequent processing by finger processor 210 and searcher 230. Input buffers 208a through 208n provide the data samples to the finger processor and searcher as they are needed.

Searcher 230 searches for strong multipath components in a given received signal and provides an indication of the strength and timing of each found multipath component that meets one or more criteria. Typically, searcher 230 searches for the pilots transmitted by the terminals to find these multipath components.

Finger processor 210 implements Q fingers, each of which may be assigned to process a different multipath component of interest (e.g., as determined by controller 160 based on the signal strength and timing information provided by searcher 230). As used herein, an "active" finger is one that is assigned to process a particular multipath component. Each active finger processes its assigned multipath component to provide demodulated symbols for that multipath component. The demodulated symbols from all active fingers on the same channel are then combined to provide the final demodulated symbols for that channel. Fingers on the same channel are typically those assigned to process a given data transmission, which may be from one terminal for the uplink or from one or multiple base stations for the downlink.

For each active finger, a segment of data samples is retrieved from a section of one of the input buffers and provided to a descrambler 212, which also receives a corresponding descrambling segment from a pseudo-random number (PN) generator 222 for the data segment. Descrambler 212 then multiplies the data samples in the segment with the corresponding descrambling segment to provide descrambled samples. Data and pilot despreaders 214a and 214b then despread or decover the descrambled samples with channelization codes for the traffic data and the pilot, respectively. The pilot samples from despreader 214b are further filtered and interpolated by a pilot filter 218 to provide pilot estimates. A data demodulator 216 then demodulates the despread samples from despreader 214a with the pilot estimates to provide demodulated symbols for the multipath component being processed.

An output buffer 240 combines the demodulated symbols from all fingers on the same channel. Output buffer 240 provides the final demodulated symbols, which may be further processed by a channel processor 250 and/or decoded by RX data processor 156 (not shown in FIG. 2) to recover the transmitted data. Channel processor 250 can communicate with higher protocol layers, sequence hardware operations, select new fingers from searcher results, remove assigned fingers or add new fingers, and so on. The design and operation of a rake receiver such as that shown in FIG. 2 is described in further detail in the U.S. Pat. Nos. 5,764,687 and 5,490,165.

FIG. 2 shows a time division multiplex (TDM) design for demodulator 154. For this TDM demodulator design, a single finger processor 210 performs all of the required finger processing (e.g., descrambling, despreading, data demodulation, and so on), and the Q fingers are implemented in a TDM manner by the finger processor. For example, finger processor 210 can perform the required processing for finger 1 in one set of clock cycles, then the required processing for finger 2 in another set of clock cycles, and so on. The Q fingers implemented by the finger processor may be just the active fingers (i.e., those that have been assigned) or may be both active fingers and inactive fingers (i.e., those that have not been assigned).

For the TDM demodulator design, one finger processor 210 can thus implement all Q fingers with different "finger slots", where each finger slot includes a set of clock cycles designated for a particular finger. All Q fingers may be cycled through in each "finger cycle" (e.g., Q fingers may be cycled through by the finger processor in one finger cycle comprised of Q finger slots). Each finger's turn would come up once in each finger cycle, and the finger that is currently being implemented by the finger processor is referred to as the "activated" finger.

Alternatively, demodulator 154 may be implemented with a "parallel" demodulator design. For this design, each of the Q fingers is implemented as a separate hardware unit. Multiple fingers may then be operated simultaneously.

Figure 3:
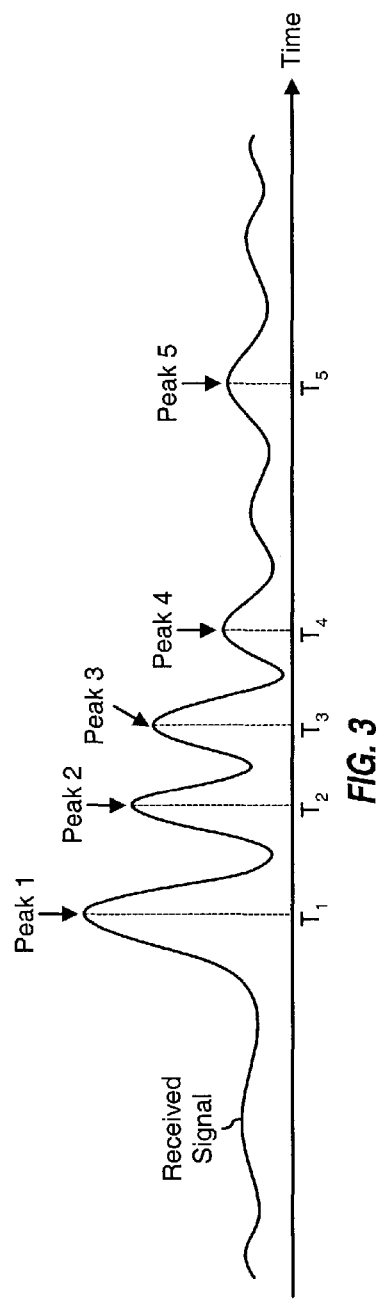
FIG. 3 shows an exemplary received signal.

FIG. 3 shows an exemplary received signal for one base station antenna. The modulated signal transmitted by each terminal may be received by the base station via a number of signal paths. The received signal for each base station antenna may thus include a number of multipath components for one or more terminals. Each multipath component is associated with a particular amplitude and time of arrival at the base station. In the example shown in FIG. 3, multipath components (or peaks) 1 through 5 are associated with arrival times of $T_1$ through $T_5$, respectively. The profile of the multipath components in the received signal is determined by the wireless channel and typically varies over time. For illustration, peaks 1 through 5 may be assigned to (and processed by) fingers 1 through 5, respectively.

Figure 4A:
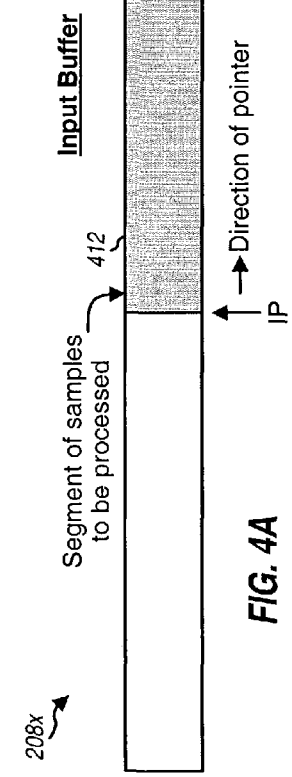
FIG. 4A shows an input buffer.

FIG. 4A shows an input buffer 208x, which may be one of input buffers 208a through 208n in FIG. 2. The received signal for each base station antenna is digitized to provide data samples that are stored in an associated input buffer. The finger processor may then be operated to process a given segment of data samples over and over for multiple active fingers. For example, data sample segment 412 may be processed once for finger 1, then again for finger 2, and so on. A pointer IP may be used to indicate the start of the segment to be processed. The IP pointer may be updated (advanced to the right) at the start of each finger cycle. Another pointer IW may be used to indicate the next location in the input buffer to write a new data sample. The IW pointer may be advanced to the right as each new data sample is written to the input buffer.

Figure 4B:
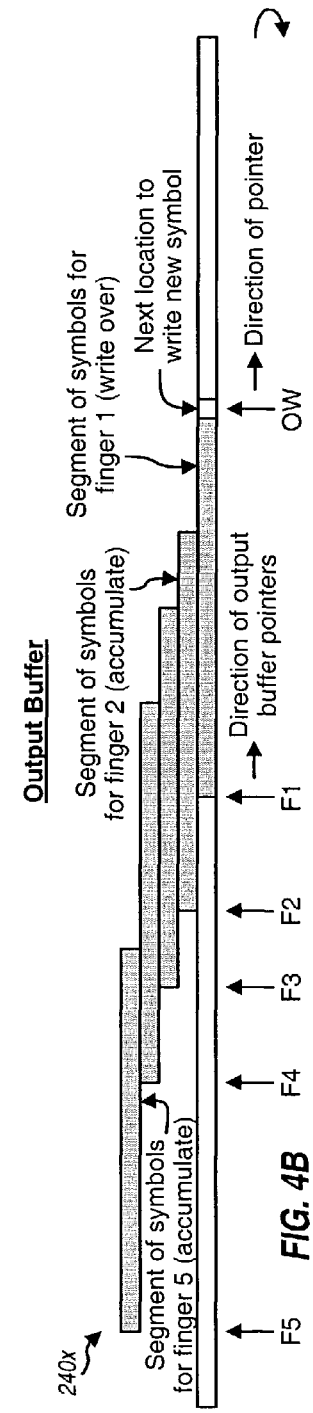
FIGS. 4B and 4C show two embodiments of an output buffer for a channel.

FIG. 4B shows an embodiment of output buffer 240x for one channel. Each of the fingers on this channel processes the same segment of data samples and provides a respective segment of demodulated symbols. Since each finger on the channel is associated with a different arrival time for its assigned multipath component (as shown in FIG. 3), the segment of demodulated symbols provided by each finger would then correspond to a different portion of a frame for the data transmission being recovered.

For example, if data sample segment 412 in FIG. 4A is processed by the active fingers, then the segment of demodulated symbols for finger 1 may be stored starting at the location indicated by pointer F1, the segment of demodulated symbols for finger 2 may be accumulated starting at the location indicated by pointer F2, the segment of demodulated symbols for finger 3 may be accumulated starting at the location indicated by pointer F3, and so on. Pointers F1 through F5 are the output buffer pointers for fingers 1 through 5, respectively, which are assigned to process peaks 1 through 5 in FIG. 3.

The storing/accumulation of the demodulated symbols from different active fingers at different starting locations in the output buffer effectively "deskew" the demodulated symbols. The deskewing aligns the peaks for the active fingers on the same channel so that the demodulated symbols from these fingers can be constructively combined.

The output buffer pointers for the active fingers are determined by the arrival times of their assigned peaks. In particular, the difference between the output buffer pointers for any pair of active fingers is determined by the difference in the arrival times of their assigned peaks. If finger 1 is used as reference, then the following can be established: $F_2-F_1 \approx T_2-T_1$, and so on, and $F_5-F_1 \approx T_5-T_1$.

A pointer OW may be used to indicate the next location in the output buffer to be written to by the first or earliest finger on the channel. The output buffer pointer for the activated finger is advanced (to the right in FIG. 4B) as the demodulated symbols are provided to the output buffer. The activated finger would be deemed as the first finger on the channel if its output buffer pointer is equal to the OW pointer, in which case the OW pointer is also advanced and the demodulated symbol writes over (instead of accumulates with) the symbol currently stored in that location.

In FIGS. 4A and 4B, the input and output buffers may each be operated as a circular buffer. For the input buffer, the IW pointer may be advanced to the right as new data samples are written to the input buffer, and would then reset to the start of the input buffer when the end of the buffer is reached. Similarly, for the output buffer, the OW pointer may be advanced to the right as demodulated symbols are written to the output buffer by the first finger, and would then reset to the start of the output buffer when the end of the buffer is reached. The other pointers are advanced and wrapped around in similar manner.

Figure 4C:
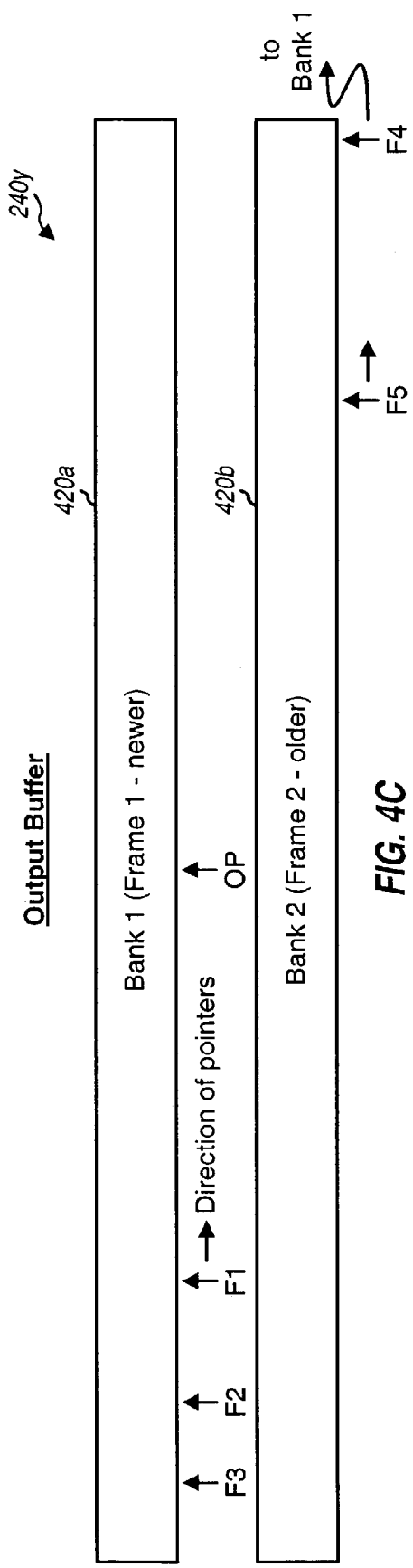

FIG. 4C shows another embodiment of output buffer 240y for one channel. For this embodiment, the output buffer for the channel is implemented with two banks 420a and 420b. Each bank 420 stores one frame of demodulated symbols for the associated channel. (A frame has a duration of 10 msec in W-CDMA.) One bank stores the demodulated symbols for a newer frame and the other bank stores the demodulated symbols for an older frame. Again, the OW pointer may be used to indicate the next location to be written to by the first or earliest finger on the channel. The OW pointer would be advanced along bank 420a, then jump to the start of bank 420b when the end of bank 420a is reached, then advanced along bank 420b, and jump back to the start of bank 420a when the end of bank 420b is reached. The output buffer pointers for the active fingers are also advanced in similar manner as their demodulated symbols are written to the output buffer. For clarity, the last finger polling is described below for this dual-bank output buffer design.

For the TDM demodulator design described above, the finger processor may be operated to implement a number of fingers. In general, each finger may be assigned to process any multipath component for any channel. Moreover, each finger is implemented independently and may not be aware of the existence or state of the other fingers.

Sufficient state information is maintained for each active finger to allow it to (1) perform the required processing and (2) provide the demodulated symbols for storage and/or accumulation in the proper location of the output buffer. Sufficient state information is also maintained for each channel to (1) allow the active fingers on the channel to perform the proper processing and (2) allow channel processor 250 and other processing units to process the final demodulated symbols as they become ready. For simplicity, only the state information used for last finger polling is described below.

The last finger polling mechanism polls the active fingers to determine when the last finger on the channel has finished its processing so that the final demodulated symbols for the channel may be processed by subsequent stages. The determination of the last finger on the channel is needed because (1) multiple fingers may be assigned to process multipath components for the same channel, (2) new fingers may be assigned as new multiple multipath components are found and current active fingers may be de-assigned as their multipath components vanish, and (3) each active finger may operate independently and may not be aware of the existence or state of the other fingers on the same channel. The last finger polling can detect for the last finger on the channel with minimal processing and with minimal interaction between the active fingers on the channel.

The last finger polling mechanism operates as follows. As each active finger is implemented by the finger processor, the activated or polled finger compares its state information with the state information for its channel to determine whether or not it is the last finger on the channel. The conditions for determining the last finger are described below. If the activated finger is deemed as the last finger on the channel, then (1) the channel state information is updated with the finger state information, and (2) the demodulated symbols from the activated finger may also be marked as being ready for subsequent processing, as described below. The demodulated symbols for the activated finger are provided to the output buffer for accumulation and may further be marked as appropriate.

Referring back to FIG. 2, finger processor 210 includes a last finger determination (LFD) unit 220 that determines whether or not the activated finger is the last finger on the associated channel. The last finger determination is made based on the activated finger's state information and the associated channel's state information, both of which are stored in a demodulator memory 260. Channel processor 250 may initiate processing on the demodulated symbols once they are marked as being ready for processing by the last finger on the channel.

Figure 5:
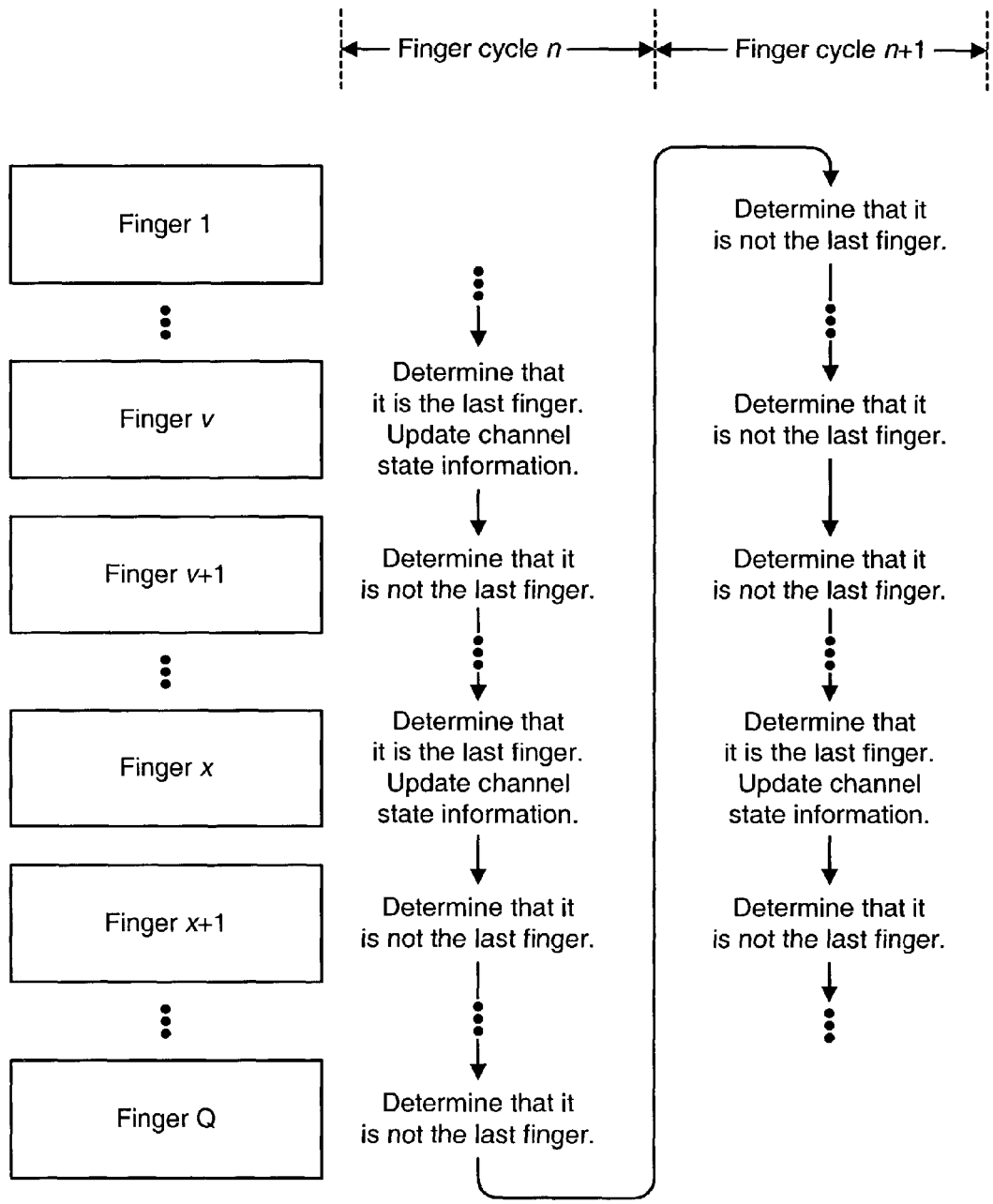
FIG. 5 shows the polling of active fingers to determine the last finger on the channel.

FIG. 5 shows the polling of the active fingers to determine the last finger on a channel. In this implementation, the active fingers are cycled through in sequential order (e.g., based on their assigned identifiers), and each finger is polled for last finger when its turn comes up. In this example, for finger cycle n, finger v initially determines that it is the last finger on the channel and updates the channel state information, as described below. Each subsequent finger up to finger x then determines that it is not the last finger on the channel. Finger x determines that it is the new last finger on the channel and therefore updates the channel state information accordingly. Each of the remaining fingers for finger cycle n determines that it is not the last finger on the channel.

The processing for the next finger cycle n+1 proceeds in similar manner. However, finger v determines that it is no longer the last finger based on the channel state information updated by finger x in the prior finger cycle n. Finger x again determines that it is the last finger on the channel and updates the channel state information. The last finger polling proceeds in similar manner for each finger slot of each finger cycle.

Typically, when the processing for a new channel first commences or when the wireless channel changes, multiple fingers may sequentially determine that they are the new last finger on this new channel. After one complete cycle through all active fingers, one finger (e.g., finger x in the FIG. 5) will be determined as the "true" last finger on the channel. For each subsequent finger cycle, this same finger will continue to be deemed as the last finger on the channel until either (1) a new finger is assigned on the channel and is later than the current last finger, or (2) the current last finger is de-assigned, in which case another finger on the channel will be the new last finger.

Figure 6:
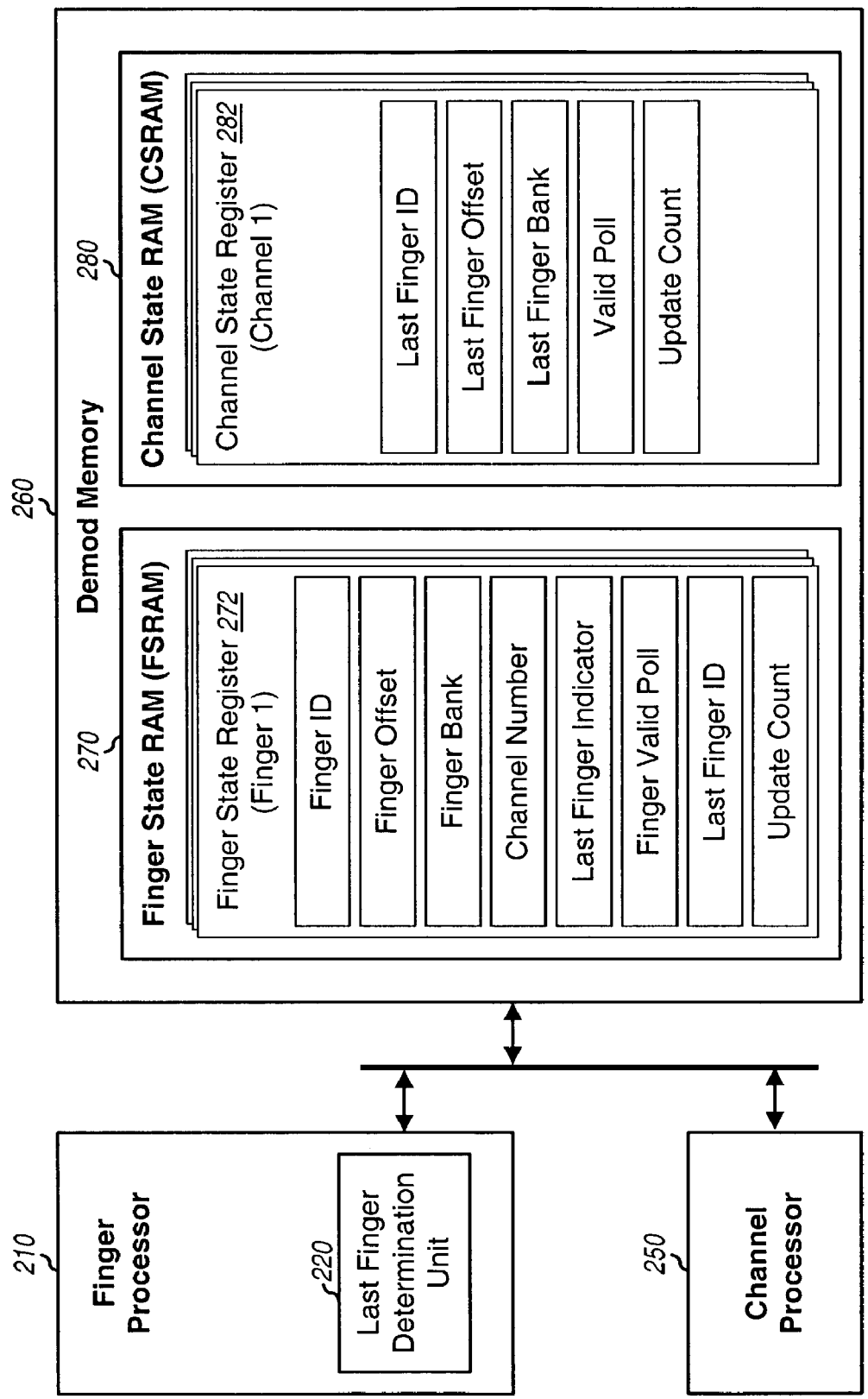
FIG. 6 shows a demodulator memory.

FIG. 6 shows an embodiment of demodulator memory 260 that includes (1) a finger state RAM (FSRAM) 270 used to store finger state information for the active fingers and (2) a channel state RAM (CSRAM) 280 used to store channel state information for all channels. In an embodiment, each active finger is associated with a respective finger state register 272 that stores various parameter values for that finger. In an embodiment, each channel is similarly associated with a respective channel state register 282 that stores various parameter values for that channel. The finger state registers for the active fingers and the channel state registers for the channels are stored in FSRAM 270 and CSRAM 280, respectively. In general, the finger and channel state information may be stored in any memory unit.

Table 1 lists the fields of an exemplary finger state register used to store finger state information applicable for last finger polling. In general, the finger state register for each active finger may include other information that may be used for other purposes, which is not shown in Table 1 for simplicity. The exemplary finger state register shown in Table 1 may be used in conjunction with the dual-bank output buffer design shown in FIG. 4C.

TABLE 1

Finger State Register

| Field | Description |
| --- | --- |
| Finger ID | An identifier for the associated finger. |
| Finger Offset | The current offset to the output buffer for the associated finger. |
| Finger Bank | The current bank in the output buffer for the associated finger. |
| Channel Number | The channel for the associated finger. |
| Last Finger Indicator | A flag indicating whether or not the associated finger is the last finger on the channel. This flag may be provided as both a hardware signal and as state information so that either hardware or software can perform the next stage of signal processing. |
| Finger Valid Poll | A bit indicating whether or not the last finger poll for the associated finger is valid. |
| Last Finger ID | An identifier for the finger considered as the last finger on the channel, as observed by the associated finger in its last finger slot. |
| Update Count | An update count for the channel, as observed by the associated finger in its last finger slot. |

For the embodiment shown in Table 1, each active finger stores its output buffer pointer in the form of an output buffer offset and a bank indicator, which are respectively stored in the Finger Offset and Finger Bank fields. The Channel Number field indicates the channel to which the active finger is assigned. The activated finger further stores the identity of the current last finger in the Last Finger ID field. The current last finger is the finger indicated as being the last finger on the channel by the channel state register. The activated finger also stores an update count in the Update Count field. This update count is incremented whenever the channel state register is updated and may be implemented with one bit, in which case the incrementing equates to simply toggling the bit. The Last Finger ID and Update Count fields are used to detect for an "orphan" last finger, which is a finger that was the last finger but has since been removed from the channel and no longer exists. The use of these various fields for last finger polling is described below.

Table 2 lists the fields of an exemplary channel state register used to store channel state information for last finger polling. Again, the channel state register for each channel may include other information that may be used for other purposes, which is not shown in Table 2 for simplicity.

TABLE 2

Channel State Register

| Field | Description |
| --- | --- |
| Last Finger ID | An identifier of the current last finger. |
| Last Finger Offset | The output buffer offset for the current last finger. |
| Last Finger Bank | The output buffer bank for the current last finger. |
| Update Count | An update count set by the current last finger. |
| Valid Poll | A bit indicating whether or not the last finger poll for the channel is valid. |

Figure 7:
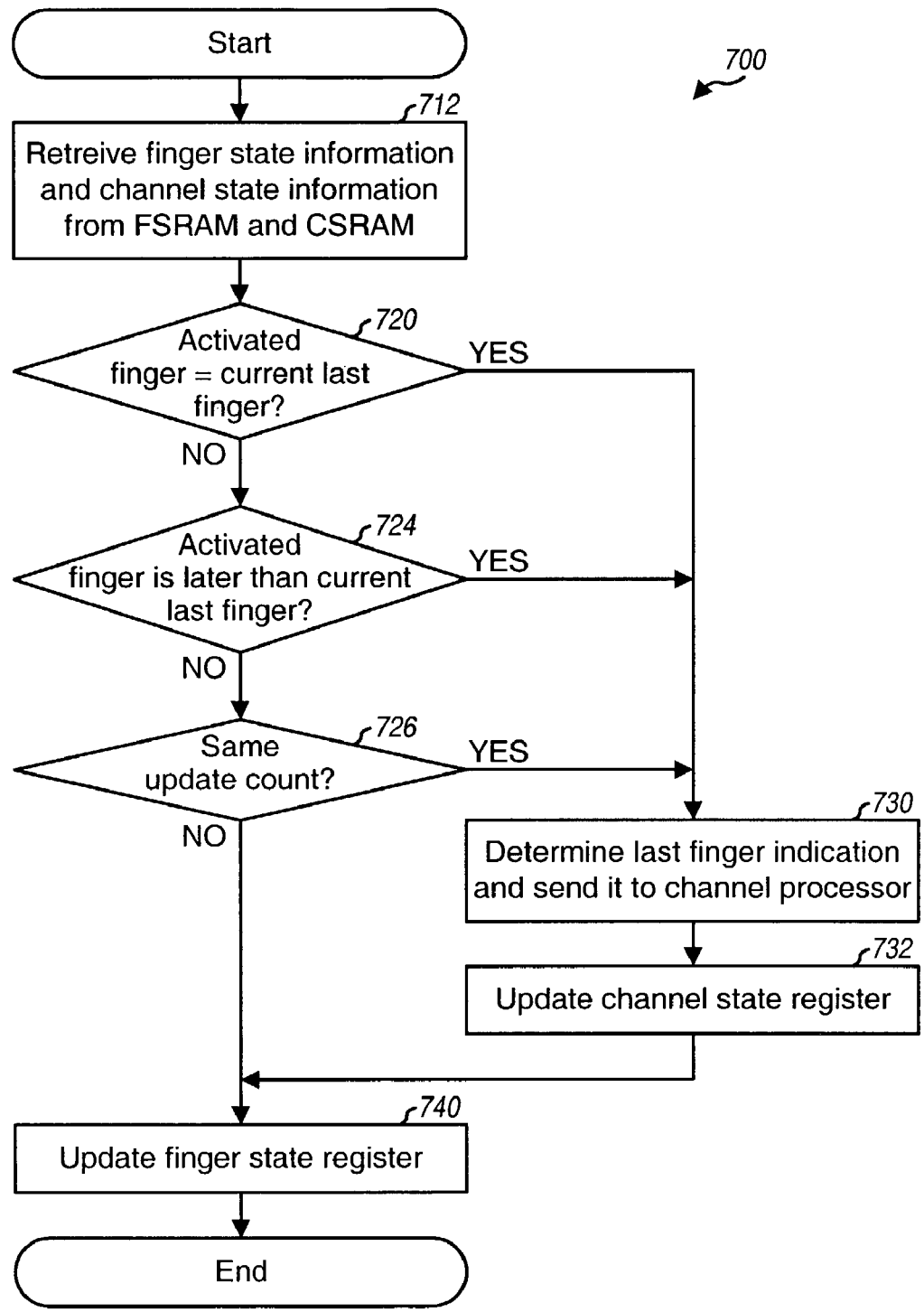
FIG. 7 shows a flow diagram of a process to determine whether or not the polled finger is the last finger on the channel.

FIG. 7 shows a flow diagram of an embodiment of a process 700 to determine whether or not the activated finger is the last finger on the channel. The activated finger is also referred to as the "polled" finger for the last finger polling. Process 700 may be implemented by last finger determination unit 220 within finger processor 210.

Initially, the finger state information for the activated finger and the channel state information for the associated channel are retrieved from FSRAM 270 and CSRAM 280, respectively (step 712). A determination is then made whether or not the activated finger is the current last finger on the channel (step 720). The activated finger is the current last finger if the Finger ID for the activated finger is equal to the Last Finger ID in the channel state register. If the activated finger is the current last finger, then the process proceeds to step 730.

Otherwise, a determination is next made whether or not the activated finger is later than the current last finger (step 724). This determination may be made by comparing the output buffer pointer for the activated finger against the output buffer pointer for the current last finger. For the output buffer design shown in FIG. 4C where two banks are used in a wrap-around manner and where symbols are stored from left to right as described above, the activated finger is later than the current last finger if either one of the following two conditions is true:

1. The output buffer pointers for the activated finger and the current last finger both point to the same bank AND the activated finger pointer is to the left of the current last finger pointer; or
2. The output buffer pointers for the activated finger and the current last finger point to different banks AND the activated finger pointer is to the right of the current last finger pointer.

Logical operations are denoted by capitalized words (e.g., AND, OR, and XOR).

Condition 1 covers the case in which the activated finger is writing to the same bank written to by the current last finger. In this case, the activated finger is later if its pointer is to the left of the current last finger pointer. Condition 1 is thus True if (a) the Finger Bank for the activated finger is equal to the Last Finger Bank in the channel state register AND (b) the Finger Offset for the activated finger is less than or equal to the Last Finger Offset in the channel state register.

Condition 2 covers the case in which the activated finger is writing to a different bank than the one written to by the current last finger. This occurs when the current last finger has wrapped to a new bank. For example, referring back to FIG. 4C, F3 may be the pointer for the current last finger and F4 may be the pointer for the activated finger. In this case, the activated finger is later if its pointer is to the right of the current last finger pointer, which assumes that the maximum difference between the first and last finger is always less than the length of one bank. Condition 2 is thus True if (a) the Finger Bank for the activated finger is not equal to the Last Finger Bank in the channel state register AND (b) the Finger Offset for the activated finger is greater than the Last Finger Offset in the channel state register.

Conditions 1 and 2 may be determined by (1) setting a first temporary variable same_bank to True if Finger Bank is equal to Last Finger Offset, (2) setting a second temporary variable larger offset to True if Finger Offset is less than or equal to Last Finger Offset, and (3) setting a third temporary variable later_finger as the exclusive-OR (XOR) of larger_offset and same_bank. The activated finger is later than the current last finger if later_finger is True, in which case the process would proceed to step 730.

If the answer for step 724 is no, then a determination is made whether the update count is the same since it was last checked by the activated finger (step 724). As noted above, the update count is incremented whenever an active finger updates the channel state register. If the update count has not changed, then one of the following three scenarios may be true:

1. There is only one finger assigned to the channel;
2. The activated finger is the last finger; or
3. The current last finger has been de-assigned or removed.

For any of these three scenarios, the activated finger would be considered as the last finger and the process would proceed to step 730. Otherwise, the process proceeds to step 740.

Step 730 is performed if any one of the three conditions for steps 720, 724, and 726 is True. In step 730, the last finger indication/flag used to indicate whether or not the demodulated symbols for the activated finger are ready for subsequent processing is determined. The last finger indication may be set to True if the activated finger is determined to be the last finger on the channel AND the current poll is deemed to be valid. In a first embodiment, the current poll is deemed to be valid if all active fingers on the channel have been polled for last finger determination. In a second embodiment, the current poll is deemed to be valid if the current last finger is not detected to be missing OR a full finger cycle is completed since the current last finger was detected to be missing. The current last finger is considered as missing if the update count has not changed in one full finger cycle AND the activated finger is not the current last finger.

In one implementation of the second embodiment, the Finger Valid Poll of each active finger is initialized to True when the finger is assigned. The current poll is then considered as valid if (1) the current last finger is not missing AND either (2a) the Valid Poll is True OR (2b) the Finger Valid Poll is False. If the current last finger is detected to be missing by the activated finger, then the Valid Poll of the channel state register and the Finger Valid Poll of the finger state register for the activated finger are both set to False. The False value for the Valid Poll will cause the polls for all subsequent fingers to be considered as not valid. When this same activated finger is polled again in the next finger cycle, after all other active fingers have been polled, the False value for the Finger Valid Poll will allow the poll to be considered as valid, and the Valid Poll is updated accordingly. The Finger Valid Poll and Valid Poll are thus used to wait one full finger cycle so that all active fingers can be polled whenever the current last finger is detected to be missing.

The last finger indication/flag is sent along with the demodulated symbols for the activated finger. It may be possible for the activated finger to be deemed as the new last finger and to update the channel state register even though the last finger indication/flag is False. In this case, the demodulated symbols for the activated finger will not be marked as ready for subsequent processing.

After step 730, the channel state register is updated with information from the finger state register for the activated finger (step 732). This updating includes (1) writing the values of the Finger ID, Finger Offset, and Finger Bank fields of the finger state register into the Last Finger ID, Last Finger Offset, and Last Finger Bank fields, respectively, of the channel state register, (2) incrementing the Update Count of the channel state register, and (3) setting the Valid Poll field of the channel state register to True if the current poll is determined to be valid and to False otherwise.

Step 740 is performed regardless of whether or not the channel state register is updated. In step 740, the finger state register for the activated finger is updated with information from the channel state register. This updating includes writing the values in the Last Finger ID and Update Count fields of the channel state register into the Last Finger ID and Update Count fields, respectively, of the finger state register. The Finger Offset and Finger Bank fields of the finger state register are also updated to account for the writing of demodulated symbols into the output buffer. If the activated finger is determined to be the last finger, then the Last Finger Indicator and Finger Valid Poll fields of the finger state register are also updated based on the last finger indication and the current poll, respectively.

The last finger and the last finger indication/flag may also be determined as follows:

this_finger=True IF the activated finger is the current last finger;
later_finger=True IF the output buffer pointer of the activated finger is later than the output buffer pointer of the current last finger;
same_update=True IF the update count has not changed since it was last checked by the activated finger;
last_finger=True IF this_finger OR later_finger OR same_update;
missed_finger=True IF same_update AND (NOT this_finger);
valid_poll=True IF (NOT missedfinger) AND (valid_poll in the channel state register is True OR finger_valid_poll in the finger state register is False);
last_finger_indication=True IF last_finger AND valid_poll.

After the processing for the activated finger is completed, the following outputs are provided by the finger: (1) a segment of demodulated symbols, (2) the channel number, (3) the output buffer pointer, and (4) the last finger indication. The channel number is used to determine which output buffer to store/accumulate the demodulated symbols. The output buffer pointer is used to determine which section of the output buffer to store/accumulate the demodulated symbols. The output buffer pointer is defined by the Finger Offset and Finger Bank for the embodiment shown in FIG. 4C and described above.

Figure 4D:
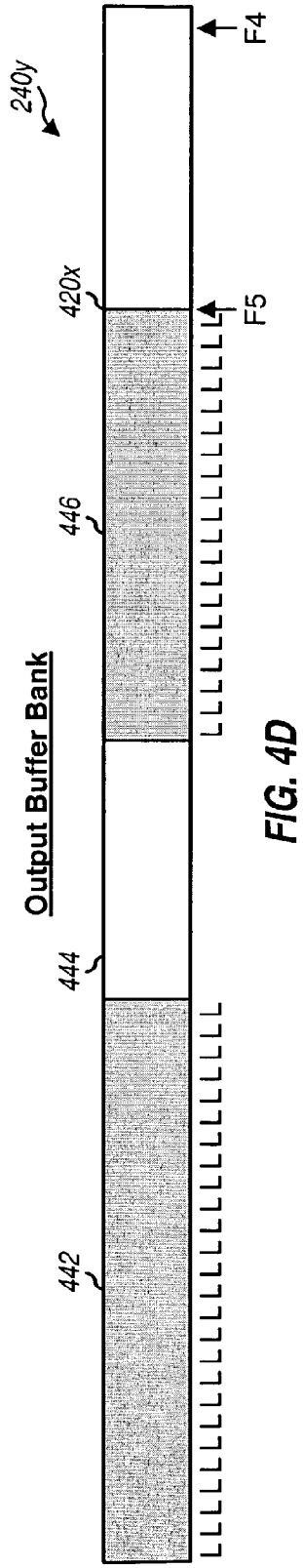
FIG. 4D shows marking of final demodulated symbols with last finger flags.

FIG. 4D shows one bank 420x of output buffer 240y whereby final demodulated symbols are marked with last finger flags. Bank 420x may be either bank 420a or 420b in FIG. 4C. The demodulated symbols provided by the finger processor for the activated finger are accumulated with other demodulated symbols in the proper section of the bank, as indicated by the output buffer pointer for the activated finger. For example, the pointer F5 may have been advanced to the location shown in FIG. 4D after a segment 446 of demodulated symbols has been provided to the output buffer. If the last finger indication/flag is True for the activated finger (i.e., the Last Finger Indicator is True), then these demodulated symbols are marked as final demodulated symbols after accumulation in the output buffer. This marking is indicated by the "L" last finger flags in FIG. 4D. Processing by subsequent stages can commence on all final demodulated symbols marked with the last finger flags.

As noted above, there may be instances where the current last finger is missed (e.g., if this finger is removed). Thus, it may be possible for the output buffer to have discontinuity in the last finger markings. For example, the demodulated symbols in section 444 are older than the demodulated symbols in section 446 but have not been marked because the last finger was missed for these symbols. In this case, if the newer demodulated symbols in section 442 are marked as final demodulated symbols, then the older demodulated symbols in section 444 are also marked as final demodulated symbols (not shown in FIG. 4D). The processing by subsequent stages can then be performed on all demodulated symbols up to the latest ones with the last finger markings.

For clarity, a specific implementation of the last finger polling has been described for the uplink in a CDMA communication system. For this implementation, the relative positions of the fingers on the channel are determined based on their output buffer pointers. In general, the relative positions of the fingers may be determined based on other indications such as, for example, the offsets of the despreading sequences associated with the fingers, the input buffer offsets (if different data segments are processed for different fingers for a given section of a frame), and so on.

The last finger polling may also be performed in some other manners, and this is within the scope of the invention. Different implementations of the last finger polling may be more suitable for different finger processor implementations. For example, for a parallel demodulator design, each individual finger may be polled by a common last finger determination unit that is external to the fingers.

The last finger polling techniques may also be used in various wireless communication systems. For example, these techniques may be used in CDMA, time division multiple access (TDMA), frequency division multiple access (FDMA), and other wireless communication systems. A CDMA system may implement one or more standards such as W-CDMA, IS-2000, IS-95 and IS-856. A TDMA system may implement one or more standards such as GSM. These standards are known in the art. The techniques described herein may also be used for downlink transmissions as well as uplink transmissions.

The polling techniques described herein may also be used to determine other parameters. For example, these techniques may be used to determine whether or not a given channel is valid. Polling may be used to efficiently determine various parameters when multiple fingers are operated independently.

The last finger polling techniques described herein may be implemented by various means. For example, these techniques may be implemented in hardware, software, or a combination thereof. For a hardware implementation, the elements used to perform the last finger polling (e.g., last finger determination unit 220) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The memory unit (e.g., demodulator memory 260) used to store the finger and channel state information may be implemented with various memory technologies such as RAM, Flash, and so on.

For a software implementation, the last finger polling may be performed with modules (e.g., procedures, functions, and so on) that perform the functions described herein. The processing for last finger polling (e.g., the process shown in FIG. 7) may be implemented with software modules. The software codes may be stored in a memory (e.g., memory unit 162 in FIGS. 1 and 2) and executed by a processor (e.g., controller 160). This memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device operable to determine a last finger on a channel, comprising:
   a memory unit operative to store state information for the channel and state information for a plurality of fingers on the channel; and
   a last finger determination (LFD) unit operative to poll, during a cycle, a finger newly activated without polling fingers previously activated, determine whether or not the polled finger is the last finger on the channel based on the state information for the channel and the state information for the polled finger, and indicate whether the polled finger is determined to be the last finger on the channel;
   wherein the LFD unit determines that the polled finger is the last finger in the cycle when one of the following occurs:
   (1) the polled finger is that finger that was the last finger in a previous cycle;
   (2) the polled finger is later than the last finger in the previous cycle based on relative positions of an output buffer pointer for the polled finger and an output buffer pointer for the last finger in the previous cycle; and
   (3) all fingers on the channel have been polled and no other finger on the channel is indicated as the last finger.

2. The device of claim 1, further comprising:
   at least one finger processor operative to implement the plurality of fingers.

3. The device of claim 2, wherein the at least one finger processor is operative to implement the plurality of fingers using time division multiplex (TDM), and wherein each of the plurality of fingers is polled when implemented by the at least one finger processor.

4. The device of claim 1, wherein the state information for the channel identifies a finger currently considered as the last finger.

5. The device of claim 4, wherein the polled finger is deemed to be the last finger if the polled finger is the finger currently considered as the last finger.

6. The device of claim 4, wherein the polled finger is deemed to be the last finger if the polled finger is later than the finger currently considered as the last finger.

7. The device of claim 1, wherein the polled finger is deemed to be the last finger if remaining ones of the plurality of fingers have been polled and none of the remaining fingers is deemed as the last finger.

8. The device of claim 1, wherein the state information for the channel is updated with the state information for the polled finger if the polled finger is deemed as the last finger.

9. The device of claim 1, wherein the LFD unit is further operative to update the state information for the polled finger based on the state information for the channel.

10. The device of claim 1, wherein the LFD unit is further operative to indicate whether symbols provided by the polled finger are ready for subsequent processing.

11. The device of claim 1, wherein the state information for the channel is stored in a channel state register, and wherein the state information for each of the plurality of fingers is stored in a respective finger state register.

12. The device of claim 1, further comprising: an output buffer operative to store demodulated symbols from the plurality of fingers, wherein demodulated symbols from each of the plurality of fingers are stored over or accumulated with existing symbols in the output buffer.

13. The device of claim 12, wherein the demodulated symbols from each of the plurality of finger are stored or accumulated at a different starting location determined by an arrival time of a signal instance being processed by the finger.

14. The device of claim 12, wherein a first finger on the channel is determined based on a pointer maintained for the first finger and a pointer maintained for the output buffer, and wherein demodulated symbols from the first finger are stored over existing symbols in the output buffer.

15. The device of claim 12, wherein final demodulated symbols are obtained in the output buffer whenever existing symbols in the output buffer are accumulated with demodulated symbols from the last finger, and wherein the final demodulated symbols are marked as being ready for subsequent processing.

16. The device of claim 1, wherein the device is operable in a Code Division Multiple Access (CDMA) communication system.

17. The device of claim 16, wherein the channel corresponds to an uplink data transmission from a terminal in the CDMA communication system.

18. The device of claim 16, wherein the channel corresponds to a downlink data transmission from at least one base station in the CDMA communication system.

19. The device of claim 16, wherein the CDMA communication system implements W-CDMA, IS-2000, or IS-95.

20. A device operable to determine last finger on a channel in a CDMA communication system, comprising:
- a memory unit operative to store state information for the channel and state information for a plurality of fingers on the channel;
- at least one finger processor operative to implement the plurality of fingers using time division multiplex (TDM); and
- a last finger determination (LFD) unit operative to poll, during a cycle, a finger newly activated without polling fingers previously activated whenever the finger is implemented by the at least one finger processor, determine whether or not the polled finger is the last finger on the channel based on the state information for the channel and the state information for the polled finger, and indicate whether the polled finger is determined to be the last finger on the channel;
- wherein the LFD unit determines that the polled finger is the last finger in the cycle when one of the following occurs:
  (1) the polled finger is that finger that was the last finger in a previous cycle;
  (2) the polled finger is later than the last finger in the previous cycle based on relative positions of an output buffer pointer for the polled finger and an output buffer pointer for the last finger in the previous cycle; and
  (3) all fingers on the channel have been polled and no other finger on the channel is indicated as the last finger.

21. An apparatus operable to determine last finger on a channel, comprising:
- means for obtaining state information for the channel;
- means for obtaining state information for a polled finger, wherein the polled finger is one of a plurality of fingers on the channel, and wherein the polled finger comprises a newly activated finger polled during a cycle without polling fingers previously activated;
- means for determining whether or not the polled finger is the last finger on the channel based on the state information for the channel and the state information for the polled finger; and
- means for indicating whether the polled finger is determined to be the last finger on the channel;
- wherein the means for determining determines that the polled finger is the last finger in the cycle when one of the following occurs:
  (1) the polled finger is that finger that was the last finger in a previous cycle;
  (2) the polled finger is later than the last finger in the previous cycle based on relative positions of an output buffer pointer for the polled finger and an output buffer pointer for the last finger in the previous cycle; and
  (3) all fingers on the channel have been polled and no other finger on the channel is indicated as the last finger.

22. The apparatus of claim 21, further comprising: means for updating the state information for the channel with the state information for the polled finger if the polled finger is deemed as the last finger.

23. The apparatus of claim 21, further comprising: means for updating the state information for the polled finger based on the state information for the channel.

24. The apparatus of claim 21, further comprising: means for indicating whether symbols provided by the polled finger are ready for subsequent processing.

25. An integrated circuit comprising:
- at least one finger processor operative to implement a plurality of fingers using time division multiplex (TDM); and
- a last finger determination (LFD) unit operative to poll, during a cycle, a finger newly activated without polling fingers previously activated, determine whether or not the polled finger is the last finger on a channel based on state information for the channel and state information for the polled finger, and indicate whether the polled finger is determined to be the last finger on the channel;
- wherein the LFD unit determines that the polled finger is the last finger in the cycle when one of the following occurs:
  (1) the polled finger is that finger that was the last finger in a previous cycle;
  (2) the polled finger is later than the last finger in the previous cycle based on relative positions of an output buffer pointer for the polled finger and an output buffer pointer for the last finger in the previous cycle; and
  (3) all fingers on the channel have been polled and no other finger on the channel is indicated as the last finger.

26. The integrated circuit of claim 25, further comprising: a memory unit operative to store the state information for the channel and state information for the plurality of fingers.

27. A base station in a wireless communication system, comprising:
- at least one finger processor operative to implement a plurality of fingers, wherein each of the plurality of fingers is operable to process a different multipath component for a channel; and
- a last finger determination (LFD) unit operative to poll, during a cycle, a finger newly activated without polling fingers previously activated, determine whether or not the polled finger is the last finger on an associated channel based on state information for the associated channel and state information for the polled finger, and indicate whether the polled finger is determined to be the last finger on the associated channel;
- wherein the LFD unit determines that the polled finger is the last finger in the cycle when one of the following occurs:
  (1) the polled finger is that finger that was the last finger in a previous cycle;
  (2) the polled finger is later than the last finger in the previous cycle based on relative positions of an output buffer pointer for the polled finger and an output buffer pointer for the last finger in the previous cycle; and
  (3) all fingers on the channel have been polled and no other finger on the channel is indicated as the last finger.

28. A terminal in a wireless communication system, comprising:
- at least one finger processor operative to implement a plurality of fingers, wherein each of the plurality of fingers is operable to process a different multipath component for a channel; and
- a last finger determination (LFD) unit operative to poll, during a cycle, a finger newly activated without polling fingers previously activated, determine whether or not the polled finger is the last finger on an associated channel based on state information for the associated channel and state information for the polled finger, and indicate whether the polled finger is determined to be the last finger on the associated channel;

wherein the LFD unit determines that the polled finger is the last finger in the cycle when one of the following occurs:

(1) the polled finger is that finger that was the last finger in a previous cycle;

(2) the polled finger is later than the last finger in the previous cycle based on relative positions of an output buffer pointer for the polled finger and an output buffer pointer for the last finger in the previous cycle; and (3) all fingers on the channel have been polled and no other finger on the channel is indicated as the last finger.

29. A method of determining last finger on a channel in a wireless communication system, comprising:

obtaining state information for the channel;

obtaining state information for a polled finger, wherein the polled finger is one of a plurality of fingers on the channel, and wherein the polled finger comprises a newly activated finger polled during a cycle without polling fingers previously activated;

determining whether or not the polled finger is the last finger on the channel based on the state information for the channel and the state information for the polled finger; and indicating whether the polled finger is determined to be the last finger on the channel;

wherein said determining comprises determining that the polled finger is the last finger in the cycle when one of the following occurs:

(1) the polled finger is that finger that was the last finger in a previous cycle;

(2) the polled finger is later than the last finger in the previous cycle based on relative positions of an output buffer pointer for the polled finger and an output buffer pointer for the last finger in the previous cycle; and (3) all fingers on the channel have been polled and no other finger on the channel is indicated as the last finger.

30. The method of claim 29, further comprising: updating the state information for the channel with the state information for the polled finger if the polled finger is deemed as the last finger.

31. The method of claim 29, further comprising: updating the state information for the polled finger based on the state information for the channel.

32. A memory unit embodying a set of instructions that when executed cause an apparatus to perform a method of determining last finger on a channel in a wireless communication system, said method comprising:

obtaining state information for the channel;

obtaining state information for a polled finger, wherein the polled finger is one of a plurality of fingers on the channel, and wherein the polled finger comprises a newly activated finger polled during a cycle without polling fingers previously activated;

determining whether or not the polled finger is the last finger on the channel based on the state information for the channel and the state information for the polled finger; and indicating whether the polled finger is determined to be the last finger on the channel;

wherein the determining comprises determining that the polled finger is the last finger in the cycle when one of the following occurs:

(1) the polled finger is that finger that was the last finger in a previous cycle;

(2) the polled finger is later than the last finger in the previous cycle based on relative positions of an output buffer pointer for the polled finger and an output buffer pointer for the last finger in the previous cycle; and (3) all fingers on the channel have been polled and no other finger on the channel is indicated as the last finger.

33. The memory unit of claim 32, the method further comprising:

updating the state information for the channel with the state information for the polled finger if the polled finger is deemed as the last finger.

34. The memory unit of claim 32, the method further comprising:

updating the state information for the polled finger based on the state information for the channel.

* * * * *